A. LIVEZEY.
J. FORD, GUARDIAN.
RAT TRAP.
APPLICATION FILED FEB. 19, 1920.
1,399,630.
Patented Dec. 6, 1921.
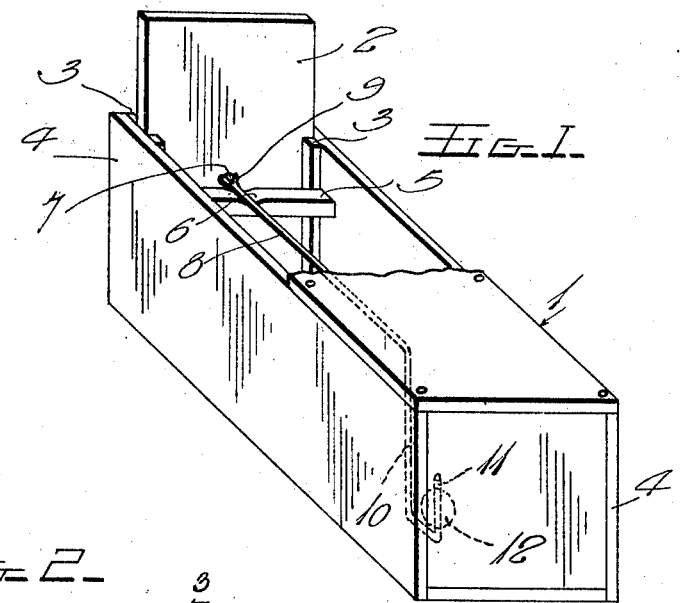
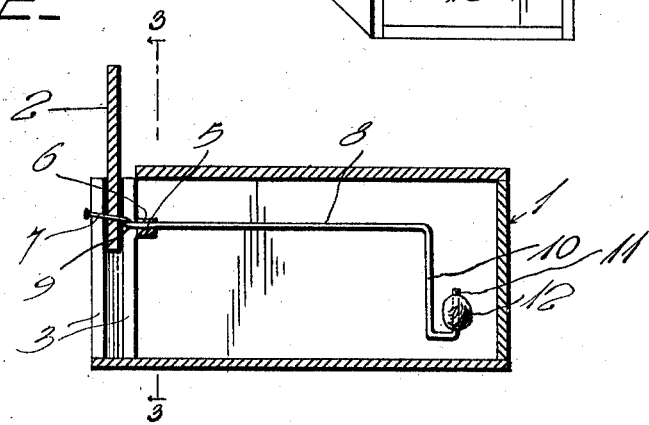
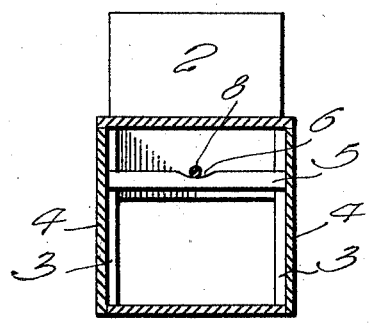
Witness
J. Ralph Hoge
Inventor
A. Livezey
By John Ford, Guardian
By H. B. Willson & Co.
Attorneys

UNITED STATES PATENT OFFICE.

ALBERT LIVEZEY, OF GRINNELL, IOWA, BY JOHN FORD, GUARDIAN.

RAT-TRAP.

1,399,630.  Specification of Letters Patent.  Patented Dec. 6, 1921.

Application filed February 19, 1920. Serial No. 359,905.

*To all whom it may concern:*

Be it known that ALBERT LIVEZEY, a citizen of the United States, residing at Grinnell, in the county of Poweshiek and State of Iowa, has invented certain new and useful Improvements in Rat-Traps, and that I, JOHN FORD, duly appointed guardian of said ALBERT LIVEZEY, do hereby declare the following to be a full, clear, and exact description of the invention, such as will enable others skilled in the art to which it appertains to make and use the same.

This invention relates to improvements in traps particularly to traps for mice, rats and the like.

The primary object is to provide a simple and practical trap which can not be operated by an animal from the outside and is extremely simple in construction.

With the above and other objects in view, the invention resides in certain novel features of construction and the combination and arrangement of parts as will be more fully described and claimed.

I attain these objects by the construction illustrated in the accompanying drawings, in which—

Figure 1, is a perspective view, with parts broken away to show interior structure;

Fig. 2, is a vertical longitudinal section of the trap; and

Fig. 3, is a sectional view taken on the line 3—3 of Fig. 2.

Similar reference numerals designate similar parts throughout the several views.

Reference is now had to the drawing in which the numeral 1 designates a box having one open end. While the drawing illustrates the trap as comprising separate side walls, bottom and top, it is to be understood that I may well use a hollow log by cutting it into suitable lengths and attaching the parts about to be described.

As shown in Fig. 2, the top of the box 1 is cut away to permit raising the gate 2, which slides vertically between two pairs of spaced guides 3, secured to the side walls 4 of the box.

A fulcrum bar 5 is disposed adjacent the inner face of the gate 2 having its ends secured to the side walls 4 by any suitable fastening elements. The fulcrum bar is spaced above the floor a suitable distance and is provided in its upper face with a groove 6 which extends the full width of said bar and is disposed in parallel relation to the side walls.

The gate 2 is provided near its lower end with a shoulder which may be formed in any suitable manner, but is preferably formed by driving a nail 7 through the gate from the outside, and allowing a small portion of the inner end to project beyond the inner face of said gate as illustrated in Fig. 2. The portion of the nail remaining on the outside of the gate, serves as a handle for lifting or raising the gate.

For the purpose of holding the gate in raised position, I provide an animal actuated trip rod 8, one end portion of which rests in the groove 6; the extreme end 9 of said portion being flattened to take under the inner end of the nail 7 which forms the aforesaid shoulder. The rear end of the rod 8 is bent downwardly to form a trigger 10 whose end is bent rearwardly in parallel relation to the trigger rod 8 and then upwardly at a rightangle forming a hook 11 upon which is supported a bait 12. In operation, the gate may be raised to the position shown in Fig. 2 by means of the nail. The flattened end 9 is then positioned beneath the shoulder on the gate, and due to the length of the trip disposed on the side of the fulcrum bar opposite the gate, the weight of the rear end of the bar will retain the gate in raised or open position. When a rat, mouse or other animal enters the trap and begins to eat the bait, the rod will be moved and will shift the end 9 from engagement with the shoulder, thereby permitting the gate normally to close by gravity and trap the animal.

From the foregoing description taken in connection with the accompanying drawing, the construction and operation of the invention will be understood without requiring a more extended explanation.

Various changes in the form proportion and minor details of construction may be made without departing from the principle or sacrificing any of the advantages of the claimed invention.

It will be further understood that in order to make the trap more effective it may be entirely covered with straw, hay or the like or by a sack, and only a small entrance opening left in such covering for the admission of the animal.

I claim:

1. An animal trap comprising a hollow body open at one end, a gravity-lowered gate slidably mounted on said body to close this open end, a shoulder on the inner face of said gate adjacent the lower edge of the latter, a transverse bar disposed in the body near the open end thereof, said bar having a notch formed in its upper face constituting a seat, a trip rod resting loosely in said seat at a point intermediate the middle and one end of the bar, said one end of the latter being flattened and engaged with the aforesaid shoulder, the opposite end of the rod extending to a point near the opposite end of the body, and a bait hook depending from the last named end of the rod, the bait, hook, and rod counterbalancing and holding said gate in open position.

2. In a trap, a hollow body having one open end, a gate slidable to close said end, said gate having a shoulder thereon, a transverse fulcrum bar spaced above the floor near said gate with its ends secured to the side walls of said body, said bar having a notch in its upper face, a trip rod having one end flattened for engagement with said shoulder to retain the gate in open position, said trip rod being fulcrumed in said notch, and a depending hook on the inner end of said trip rod, extending to a point near the floor to receive the bait.

In testimony whereof I have hereunto set my hand.

JOHN FORD,
*Guardian of Albert Livezey.*